US011689797B2

(12) United States Patent
Ito et al.

(10) Patent No.: US 11,689,797 B2
(45) Date of Patent: Jun. 27, 2023

(54) CAMERA, METHOD, NON-TRANSITORY COMPUTER-READABLE MEDIUM, AND SYSTEM

(71) Applicant: Sony Group Corporation, Tokyo (JP)

(72) Inventors: Daisuke Ito, Tokyo (JP); Kaoru Takada, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/637,400

(22) PCT Filed: Aug. 7, 2018

(86) PCT No.: PCT/JP2018/029584
§ 371 (c)(1),
(2) Date: Feb. 7, 2020

(87) PCT Pub. No.: WO2019/035390
PCT Pub. Date: Feb. 21, 2019

(65) Prior Publication Data
US 2020/0252544 A1    Aug. 6, 2020

(30) Foreign Application Priority Data
Aug. 17, 2017   (JP) .................................. 2017-157452

(51) Int. Cl.
*H04N 23/617* (2023.01)
*H04N 23/62* (2023.01)
(Continued)

(52) U.S. Cl.
CPC .......... *H04N 23/617* (2023.01); *H04N 23/62* (2023.01); *H04N 23/661* (2023.01)

(58) Field of Classification Search
USPC ................................. 386/223–224, 239–248
See application file for complete search history.

(56) References Cited

U.S. PATENT DOCUMENTS 5,672,918 A * 9/1997 Kimbrough ............ H02H 5/005
307/126
2004/0169772 A1   9/2004 Matsui et al.
(Continued)

FOREIGN PATENT DOCUMENTS

CN         102741900 A    10/2012
CN         104639836 A     5/2015
(Continued)

OTHER PUBLICATIONS

Japanese Office Action dated Aug. 11, 2021 for corresponding Japanese Application No. 2017-157452.
(Continued)

*Primary Examiner* — Hung Q Dang
(74) *Attorney, Agent, or Firm* — Michael Best & Friedrich LLP

(57) ABSTRACT

The present disclosure includes an information processing apparatus, an information processing method, a non-transitory computer-readable medium, and a system. In one example, the information processing apparatus is a camera. The camera includes a memory, communication circuitry, and control circuitry. The memory is configured to store a first set of backup camera settings. The communication circuitry is configured to communicate with a server, the server configured to store a second set of backup camera settings. The control circuitry is configured to perform a start-up process when the camera is turned ON, the start-up process includes comparing the first set of backup camera settings to the second set of backup camera settings to determine whether the first set of backup camera settings is newer than the second set of backup camera settings.

17 Claims, 13 Drawing Sheets

(51) Int. Cl.
*H04N 23/661* (2023.01)
*G06F 11/14* (2006.01)
*G06F 16/21* (2019.01)
*G11B 27/11* (2006.01)
*H04N 5/77* (2006.01)
*G06F 9/445* (2018.01)

(56) References Cited

U.S. PATENT DOCUMENTS

| | | | | |
|---|---|---|---|---|
| 2007/0122140 A1* | 5/2007 | Ito | ............... | H04N 5/23241 |
| | | | | 396/301 |
| 2011/0149086 A1 | 6/2011 | Winbush, III | | |
| 2011/0317049 A1* | 12/2011 | Ku | ............... | H04N 5/23203 |
| | | | | 348/294 |
| 2012/0002012 A1* | 1/2012 | O'Grady | ............... | H04N 5/2354 |
| | | | | 348/45 |
| 2013/0033603 A1* | 2/2013 | Suzuki | ............... | G08G 1/096775 |
| | | | | 348/148 |
| 2014/0218563 A1* | 8/2014 | Sugimoto | ............... | H04N 5/232941 |
| | | | | 348/231.6 |
| 2014/0267745 A1* | 9/2014 | Martin | ............... | G08B 13/1968 |
| | | | | 348/159 |
| 2015/0341210 A1* | 11/2015 | Ranbro | ............... | H04L 41/0809 |
| | | | | 709/222 |
| 2017/0195386 A1 | 7/2017 | Nathan et al. | | |
| 2017/0346694 A1* | 11/2017 | Buendgen | ............... | H04L 41/0856 |

FOREIGN PATENT DOCUMENTS

| | | |
|---|---|---|
| CN | 106790710 A | 5/2017 |
| JP | 2001-290188 A | 10/2001 |
| JP | 2004072222 A | 3/2004 |
| JP | 2006186408 A | 7/2006 |
| JP | 2017041110 A | 2/2017 |
| JP | 2017130892 A | 7/2017 |

OTHER PUBLICATIONS

Chinese Office Action dated Mar. 2, 2021 for corresponding Chinese Application No. 201880051754.6.

* cited by examiner

CAMERA, METHOD, NON-TRANSITORY COMPUTER-READABLE MEDIUM, AND SYSTEM

TECHNICAL FIELD

The present technology relates to an information processing apparatus, an information processing method, and a program and particularly to an information processing apparatus, an information processing method, and a program that permit reproduction of the latest states even in the event of an unintended error.

BACKGROUND ART

It has been common practice up to now for a camera to store its setting states at that time in a RAM area. Details recorded in the RAM area disappear when the power to the camera is interrupted. For this reason, when the power is turned off, the camera records setting states at that time in a non-volatile memory or other device as a termination process. However, if a normal termination process cannot be performed due to some kind of error, there is a case in which the setting states at that time cannot be recorded.

PTL 1 discloses a technology that stores an iris dial setting state in a non-volatile memory when the power is turned off and checks, when the power is turned on, the iris dial state and compares it against the state when the power is turned off.

In the configuration of PTL 1, in the case where the two do not match as a result of the comparison, a warning to that effect is output. Therefore, when the power is turned off once and turned on again, it is possible to prevent shooting with the setting state different from that when the power is turned off.

CITATION LIST

Patent Literature

[PTL 1]
JP 2001-290188A

SUMMARY OF INVENTION

Technical Problem

However, in the case where the power is turned off due to an unintended error, even the configuration of PTL 1 is unable to store setting states at that time in a non-volatile memory.

The present technology has been devised in light of such circumstances, and it is an object of the present technology to permit reproduction of the latest states even in the event of an unintended error.

Solution to Problem

In one exemplary embodiment, the present disclosure includes a camera. The camera includes a memory, communication circuitry, and control circuitry. The memory is configured to store a first set of backup camera settings. The communication circuitry is configured to communicate with a server, the server configured to store a second set of backup camera settings. The is control circuitry configured to perform a start-up process when the camera is turned ON, the start-up process includes comparing the first set of backup camera settings to the second set of backup camera settings to determine whether the first set of backup camera settings is newer than the second set of backup camera settings.

In another exemplary embodiment, the present disclosure includes a method. The method includes controlling, with a control circuitry, a memory of a camera to store a first set of backup camera settings. The method also includes performing, with the control circuitry, a start-up process when the camera is turned ON, the start-up process includes comparing the first set of backup camera settings to a second set of backup camera settings stored in a server to determine whether the first set of backup camera settings is newer than the second set of backup camera settings.

In another exemplary embodiment, the present disclosure includes a non-transitory computer-readable medium. The non-transitory computer-readable medium comprising program instructions that, when executed by an electronic processor, causes the electronic processor to perform a set of operations. The set of operations includes controlling a memory of a camera to store a first set of backup camera settings. The set of operations also includes performing a start-up process when the camera is turned ON, the start-up process includes comparing the first set of backup camera settings to a second set of backup camera settings stored in a server to determine whether the first set of backup camera settings is newer than the second set of backup camera settings.

In yet another exemplary embodiment, the present disclosure includes a system. The system includes a server and a camera. The server is configured to store a first set of backup camera settings. The camera includes a memory, communication circuitry, and control circuitry. The memory is configured to store a second set of backup camera settings. The communication circuitry is configured to communicate with the server. The control circuitry is configured to perform a start-up process when the camera is turned ON, the start-up process includes comparing the second set of backup camera settings to the first set of backup camera settings to determine whether the second set of backup camera settings is newer than the first set of backup camera settings.

Advantageous Effects of Invention

According to the present technology, it is possible to reproduce the latest states even in the event of an unintended error.

It should be noted that the effects described herein are not necessarily limited and may be any of the effects described in this disclosure.

DESCRIPTION OF EMBODIMENTS

A description will be given below of a mode for carrying out the present disclosure (hereinafter referred to as an embodiment). It should be noted that the description will be given in the following order:
1. Configuration of Camera System
2. Operation of Camera in Camera System
3. Configuration of Information Processing System
4. Application Example

1. Configuration of Camera System

Overview of Camera System

Figure 1:
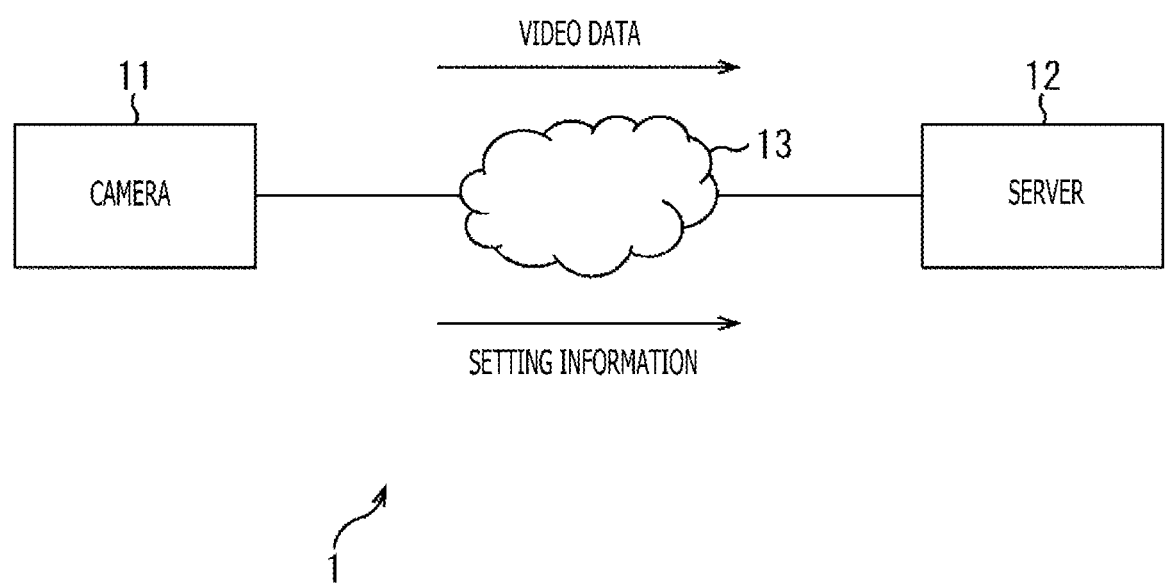
FIG. 1 is a diagram illustrating an overview of a camera system according to the present embodiment.

FIG. 1 is a diagram illustrating an overview of a camera system according to the present embodiment.

In a camera system 1 illustrated in FIG. 1, a camera 11 sends data of a video being shot (video data) to a server 12 in real time via a network 13 such as the Internet. Also, the camera 11 sends, at a given time such as when settings of an own apparatus are changed, setting information indicating details of settings at that time to the server 12.

The server 12 receives video data sent from the camera 11, records the data in real time, and receives and records setting information sent from the camera 11 at a given time.

That is, the camera system 1 realizes a cloud storage that uploads, to the server 12, a video being shot with the camera 11. It should be noted that data recorded in the server 12 is not limited to video data and may be, for example, so-called time lapse data having a plurality of consecutive still images connected together to make them look like a video.

It should be noted that the camera 11 and the network 13 may be connected with a wired line or with a wireless line.

Although a detailed description will be given later, the camera 11 also records setting information in a main body and compares, at the time of startup, setting information in the main body (hereinafter referred to as main body side setting information) and setting information recorded in the server 12 (hereinafter referred to as external setting information). It should be noted that although we assume, in the description given below, that external setting information is recorded in the server 12, the apparatus that records external setting information is not limited to the server 12, and external setting information can be recorded in an external apparatus connected to the camera 11 via the network 13 or other line.

Configuration Example of Camera

Figure 2:
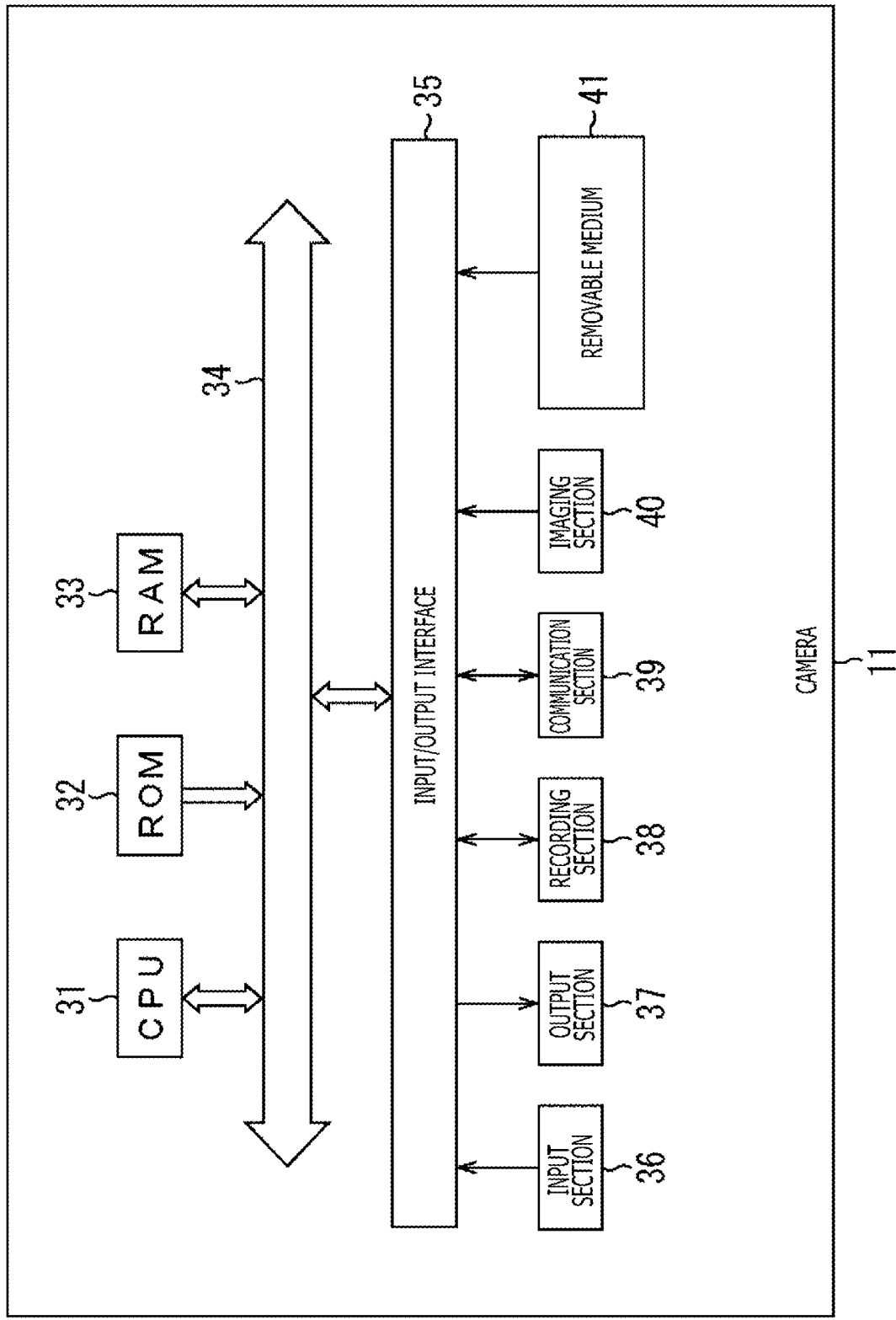
FIG. 2 is a block diagram illustrating a configuration example of a camera.

FIG. 2 is a block diagram illustrating a configuration example of the camera 11.

In the camera 11 illustrated in FIG. 2, a CPU (Central Processor Unit) 31 performs processes for realizing a variety of functions included in the camera 11 in accordance with a program stored in a ROM (Read Only Memory) 32 or a program loaded in a RAM (Random Access Memory) 33. Data required for the CPU 31 to perform a variety of processing tasks and so on are also stored in the RAM 33.

The CPU 31, the ROM 32, and the RAM 33 are connected to each other via a bus 34. An input/output interface 35 is also connected to this bus 34.

An input section 36, an output section 37, a recording section 38, a communication section 39, and an imaging section 40 are connected to the input/output interface 35.

The input section 36 includes keys, buttons, a touch panel, a microphone and so on, and the output section 37 includes a display, a speaker, and so on. The recording section 38 includes a non-volatile memory and so on, and the communication section 39 includes an antenna to perform a variety of wireless communication tasks and so on.

The imaging section 40 includes a CMOS (Complementary Metal Oxide Semiconductor) image sensor and so on.

A removable medium 41 that includes a non-volatile memory and so on is connected, as necessary, to the input/output interface 35.

Functional Configuration Example of Camera and Server

Figure 3:
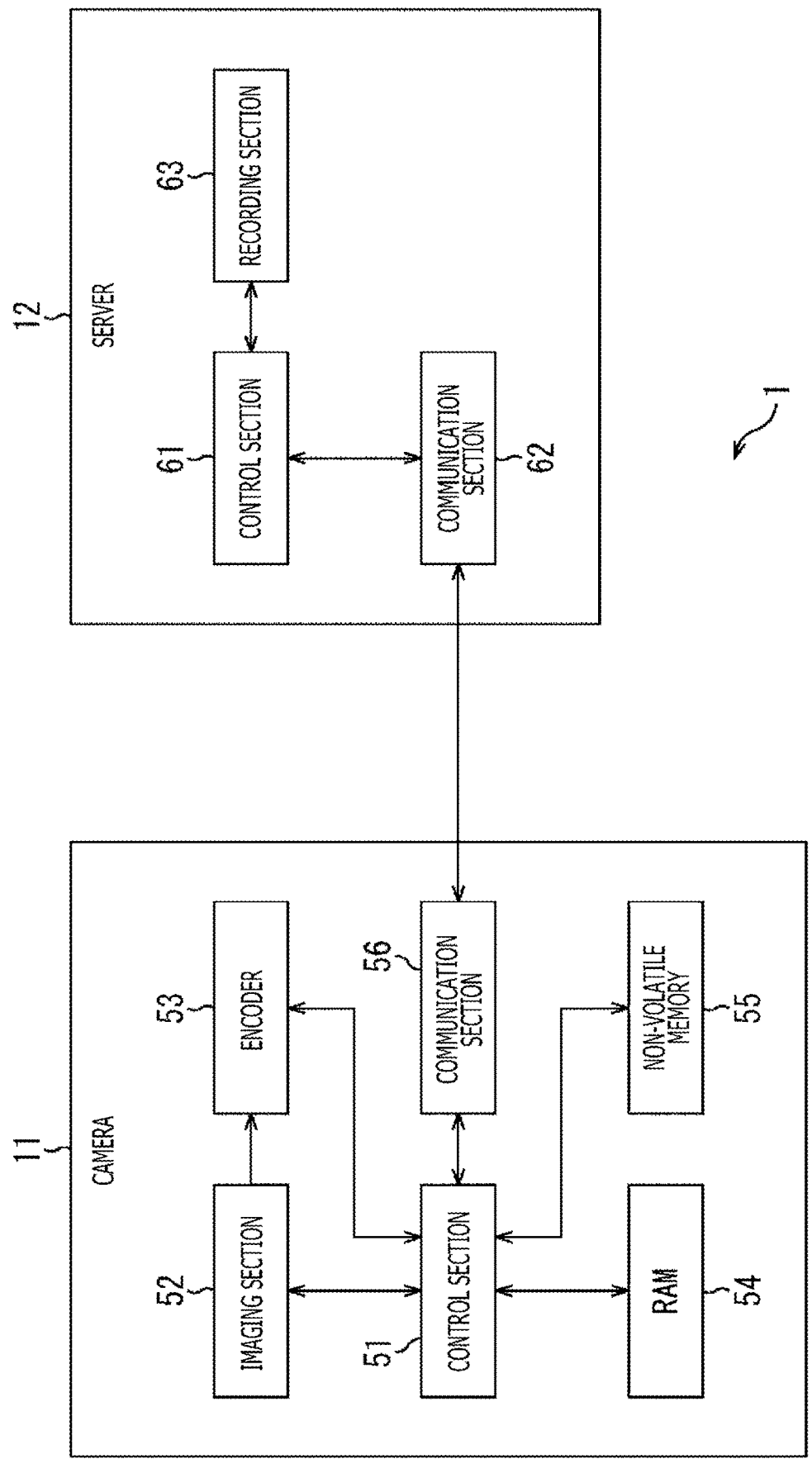
FIG. 3 is a block diagram illustrating a functional configuration example of the camera and a server.

FIG. 3 is a block diagram illustrating a functional configuration example of the camera 11 and the server 12 in the camera system 1.

The camera 11 illustrated in FIG. 3 includes a control section 51, an imaging section 52, an encoder 53, a RAM 54, a non-volatile memory 55, and a communication section 56.

The control section 51 corresponds to the CPU 31 illustrated in FIG. 2 and controls each section of the camera 11, for example, on the basis of details of settings specified by user operation to the input section 36. The control section 51 supplies, as appropriate, setting information indicating details of settings to the RAM 54, the non-volatile memory 55, and the communication section 56.

The imaging section 52 corresponds to the imaging section 40 illustrated in FIG. 2 and images a subject. Specifically, the imaging section 52 shoots a video. The encoder 53 encodes video data acquired by the imaging section 52 and generates video data that includes a plurality of frames. Video data generated by the encoder 53 is supplied to the communication section 56 by the control section 51.

The RAM 54 corresponds to the RAM 33 illustrated in FIG. 2 and retains information under power supply. The non-volatile memory 55 corresponds to the ROM 32, the recording section 38, and the removable medium 41 illustrated in FIG. 2 and can retain information without power supply.

The communication section 56 corresponds to the communication section 39 illustrated in FIG. 2 and communicates with the server 12 under control of the control section 51. The communication section 56 sends video data, generated by the encoder 53, to the server 12 and sends setting information indicating details of settings at that time to the server 12 at a given time such as when settings of the camera 11 are changed. Also, the communication section 56 receives from the server 12 setting information recorded in the server 12 and supplies it to the control section 51.

On the other hand, the server 12 includes a control section 61, a communication section 62, and a recording section 63.

The control section 61 controls each section of the server 12. Specifically, the control section 61 controls communication of the communication section 62 and controls recording of the recording section 63.

The communication section 62 communicates with the camera 11 under control of the control section 61. The communication section 62 receives video data and setting information sent from the camera 11 and sends setting information, recorded in the recording section 63, to the camera 11.

The recording section 63 can also retain information without power supply and records video data and setting information received by the communication section 62 under control of the control section 61. Setting information recorded in the recording section 63 is read by the control section 61 and supplied to the communication section 62 as appropriate.

Functional Configuration Example of Control Section

A description will be given next of a functional configuration example of the control section 51 of the camera 11 with reference to FIG. 4.

Figure 4:
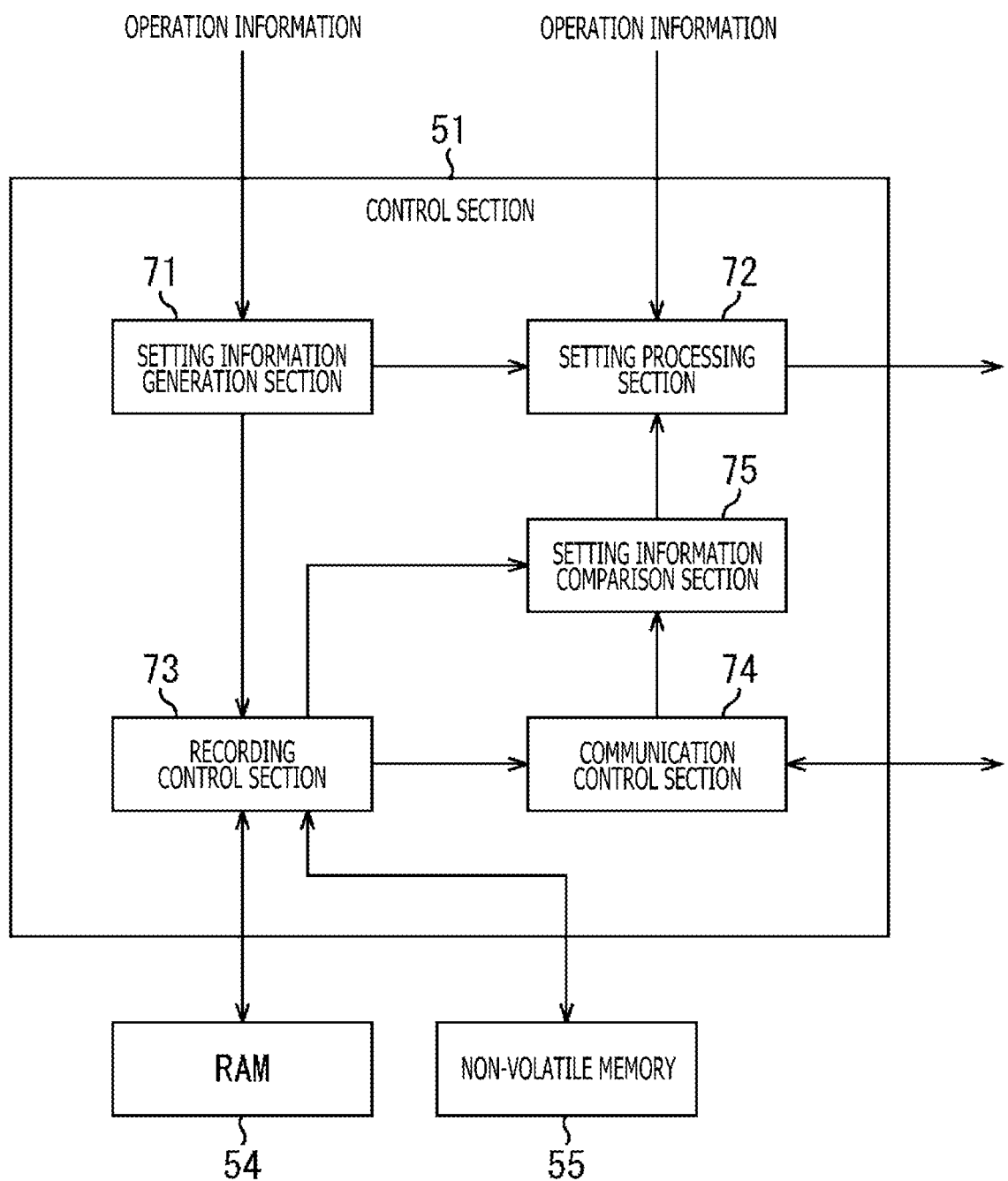
FIG. 4 is a block diagram illustrating a functional configuration example of a control section.

The control section 51 illustrated in FIG. 4 includes a setting information generation section 71, a setting processing section 72, a recording control section 73, a communication control section 74, and a setting information comparison section 75.

The setting information generation section 71 generates setting information regarding imaging indicating details of settings of the camera 11 on the basis of operation information indicating details of user operations on the input section 36.

Setting information includes not only information indicating details of settings regarding imaging such as lens iris value, shutter speed, and focal distance but also information indicating details of settings regarding video data recording such as recording format, image size, frame rate, and compression method. Also, setting information may include information indicating the operating state of the camera 11 such as a through image being displayed, a video being recorded, or a still image being recorded at present by the camera 11.

The setting processing section 72 specifies various settings of the camera 11 on the basis of setting information generated by the setting information generation section 71. As a result, details of settings indicated by setting information are reflected into each section of the camera 11. It should be noted that the setting processing section 72 can specify various settings of the camera 11 on the basis of setting information supplied from the setting information comparison section 75 as will be described later.

The recording control section 73 controls recording of setting information in the RAM 54 and the non-volatile memory 55. Also, the recording control section 73 reads setting information recorded in the RAM 54 or the non-volatile memory 55 as appropriate. Further, the recording control section 73 controls recording of setting information in the server 12 via the communication control section 74.

Thus, setting information of the camera 11 is recorded not only in the main body of the camera 11 but also in the server 12.

The communication control section 74 sends and receives information to and from the server 12 by controlling communication with the server 12 by the communication section 56 (FIG. 3). Specifically, the communication control section 74 sends, to the server 12, setting information to be recorded in the server 12 by the recording control section 73 and receives setting information sent from the server 12.

The setting information comparison section 75 compares, at the time of startup, setting information (main body side setting information) read from the non-volatile memory 55 by the recording control section 73 and setting information (external setting information) received from the server 12 under control of the communication control section 74. The setting information comparison section 75 supplies, as a result of comparison, main body side setting information or external setting information to the setting processing section 72.

In this case, the setting processing section 72 specifies various settings of the camera 11 on the basis of main body side setting information or external setting information supplied from the setting information comparison section 75.

2. Operation of Camera in Camera System

A description will be given below of the action of the camera 11 in the camera system 1.

Setting Information Recording Process

Figure 5:
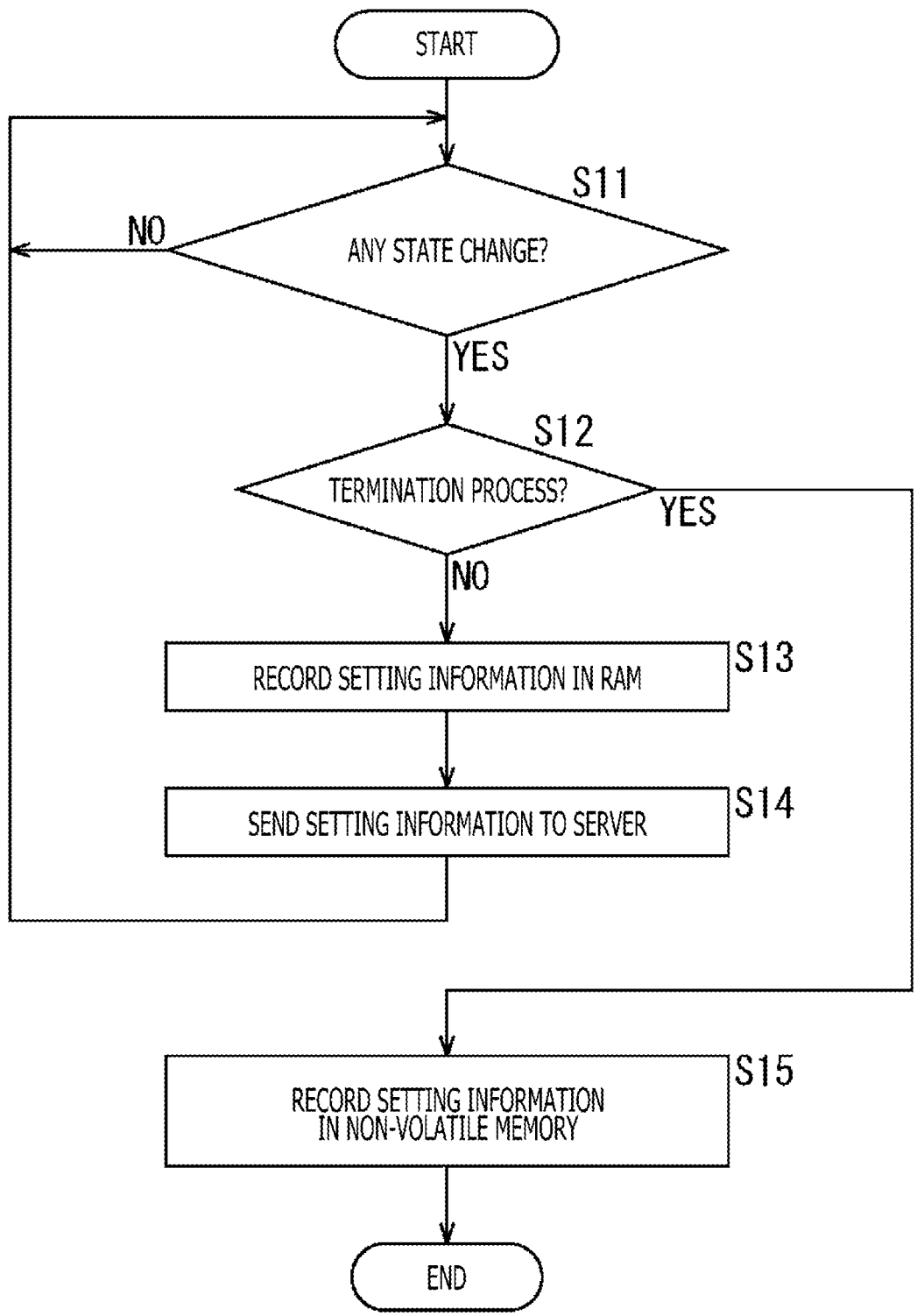
FIG. 5 is a flowchart describing a setting information recording process.

A description will be given first of a setting information recording process by the camera 11 with reference to the flowchart illustrated in FIG. 5.

In step S11, the control section 51 determines whether or not some kind of state change has taken place in the camera 11. Here, for example, it is determined whether or not an instruction has been issued to change a setting or perform a termination process (i.e., turning off the power) by user operation, whether or not a change has been detected in a surrounding environment (ambient temperature, humidity, brightness or the like) of the camera 11, and so on in addition to whether or not the operating state of the camera 11 has changed. Also, if the camera 11 is shooting a video, it may be determined whether or not a change in a subject of the video being shot has been detected as a state change.

While it is determined that there is no state change, the process in step S11 is repeated. Then, in the case where it is determined that a state change has taken place, the process proceeds to step S12.

In step S12, the control section 51 determines whether or not an instruction has been issued to perform the termination process.

In the case where it is determined in step S12 that no instruction has been issued to perform the termination process, the process proceeds to step S13.

At this time, the setting information generation section 71 generates setting information on the basis of a change in operating state of the camera 11, an instruction issued to change a setting by user operation, and so on. Also, the setting processing section 72 specifies various settings of the camera 11 on the basis of setting information generated by the setting information generation section 71.

In step S13, the recording control section 73 records setting information, generated by the setting information generation section 71, in the RAM 54.

Further, in step S14, the recording control section 73 sends setting information, generated by the setting information generation section 71, to the server 12, via the communication control section 74.

After step S14, the process returns to step S11 to repeat the processes from step S11 to step S14. That is, each time a state change takes place excluding an instruction to perform the termination process, setting information at that time is recorded in both the RAM 54 and the server 12 (setting information therein is updated).

It should be noted that all setting information may be recorded in the RAM 54 and the server 12. Alternatively, of setting information, the camera 11 may retain basic information therein, and difference information indicating the difference from the basic information may be recorded in the RAM 54 and the server 12. This makes it possible to improve the speed at which recorded information is read.

On the other hand, in the case where it is determined in step S12 that an instruction has been issued to perform the termination process, the process proceeds to step S15.

In step S15, the recording control section 73 reads setting information recorded in the RAM 54 and records that setting information in the non-volatile memory 55.

Thus, in the case where the termination process is performed normally on the basis of an instruction to perform the termination process (turn off the power), setting information at that time is recorded in the non-volatile memory 55.

Also, in the case where the normal termination process is not performed due to an unintended error such as static discharge to the camera 11 or malfunction of the camera 11 itself, even if setting information at that time recorded in the RAM 54 is deleted, the same setting information is recorded in the server 12. It should be noted that, in this case, setting information at the time of the previous normal termination process is recorded in the non-volatile memory 55.

It should be noted that although, in the above process, setting information is sent to the server 12 and recorded therein in response to a state change in the camera 11 as a trigger, setting information may be successively sent to the server 12 and recorded therein rather than in response to a state change in the camera 11.

Figure 6:
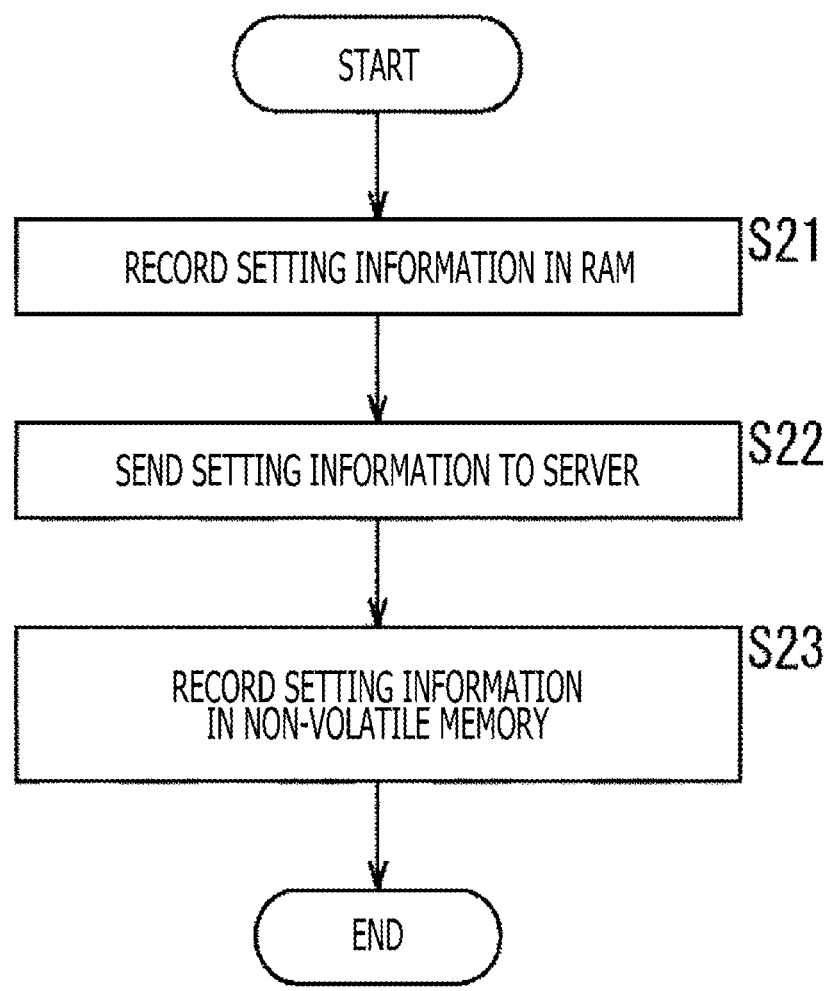
FIG. 6 is a flowchart describing the setting information recording process.

FIG. 6 is a flowchart describing the setting information recording process that does not use a state change in the camera 11 as a trigger. The processes in FIG. 6 may be performed at a regular interval or at an arbitrary time. Also, when the processes in FIG. 6 begin, the setting information generation section 71 generates setting information on the basis of details of settings of the camera 11 at that time.

In step S21, the recording control section 73 records setting information, generated by the setting information generation section 71, in the RAM 54.

In step S22, the recording control section 73 sends setting information, generated by the setting information generation section 71, to the server 12 via the communication control section 74.

In step S23, the recording control section 73 reads setting information recorded in the RAM 54 and records that setting information in the non-volatile memory 55.

The processes as described above make it possible to successively send setting information to the server 12 and record it therein irrespective of whether a state change takes place in the camera 11.

Startup Process

Figure 7:
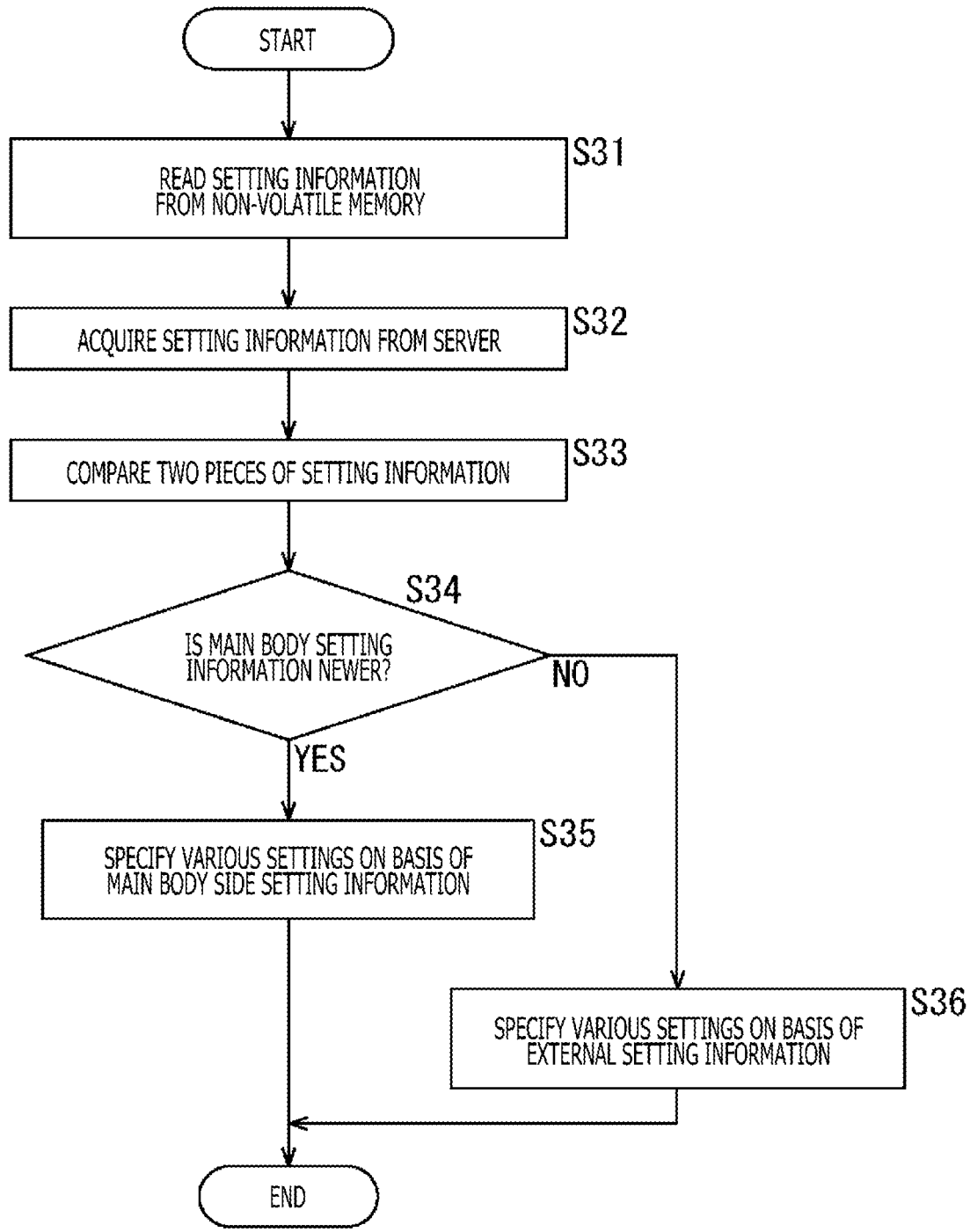
FIG. 7 is a flowchart describing a startup process.

A description will be given next of a startup process of the camera 11 with reference to the flowchart illustrated in FIG. 7. The processes illustrated in FIG. 7 are performed not only when the power is turned on by user operation but also when the camera 11 itself recovers from an error and when the camera 11 itself restarts.

In step S31, the recording control section 73 reads setting information (main body side setting information) from the non-volatile memory 55 and supplies it to the setting information comparison section 75.

In step S32, the communication control section 74 acquires setting information (external setting information) from the server 12 by controlling the communication section 56 and supplies it to the setting information comparison section 75.

In step S33, the setting information comparison section 75 compares two pieces of setting information. Specifically, the setting information comparison section 75 compares main body side setting information from the recording control section 73 and external setting information from the communication control section 74 to determine which is newer.

A description will be given here of a specific example of comparison of setting information.

Figure 8:
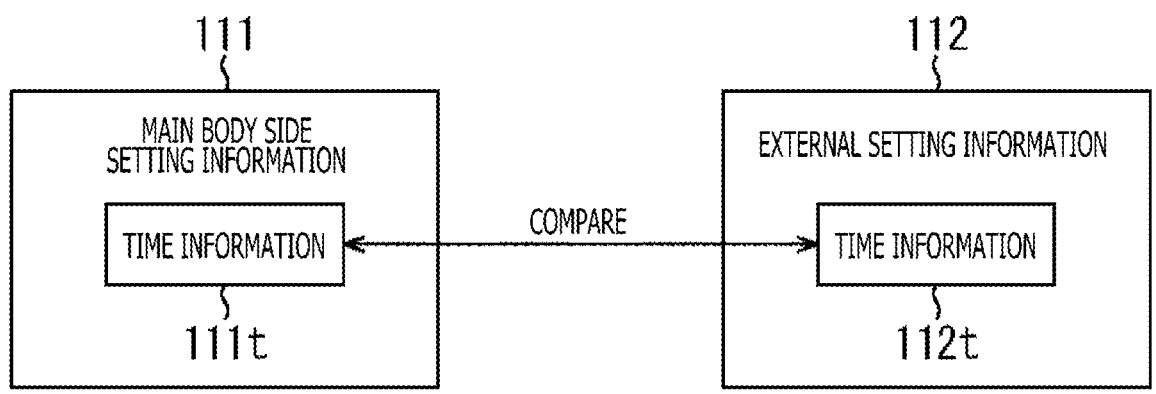
FIG. 8 is a diagram describing an example of comparison of setting information.

For example, we assume that the recording control section 73 records setting information including time information indicating recording time at the time of recording of setting information. Specifically, as illustrated in FIG. 8, main body side setting information 111 includes time information 1ilt, and external setting information 112 includes time information 112t.

In this case, the setting information comparison section 75 compares the time information 1ilt and the time information 112t to determine which indicates a later time, thereby comparing the main body side setting information 111 and the external setting information 112 to determine which is newer.

Figure 9:
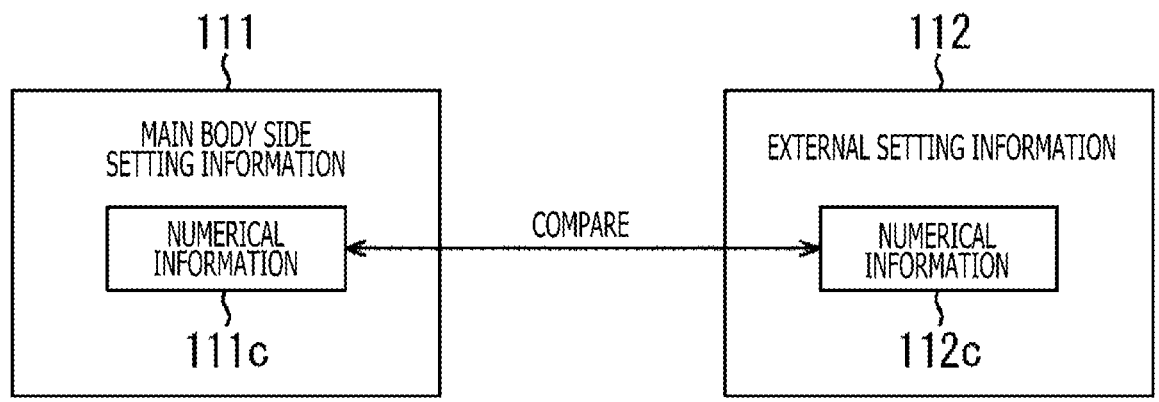
FIG. 9 is a diagram describing an example of comparison of setting information.

Also, the recording control section 73 may record setting information including numerical information indicating a value that is incremented each time recording is performed at the time of recording of setting information. Specifically, as illustrated in FIG. 9, the main body side setting information 111 includes numerical information 111c, and the external setting information 112 includes numerical information 112c.

In this case, the setting information comparison section 75 compares the numerical information 111c and the numerical information 112c to determine which indicates a larger value, thereby comparing the main body side setting information 111 and the external setting information 112 to determine which is newer.

Referring back to the flowchart illustrated in FIG. 7 now, in step S34, the setting information comparison section 75 determines whether or not the main body side setting information is newer on the basis of a comparison result.

In the case where it is determined in step S34 that the main body side setting information is newer, the setting information comparison section 75 supplies the main body side setting information to the setting processing section 72, and the process proceeds to step S35.

In step S35, the setting processing section 72 specifies various settings of the camera 11 on the basis of the main body side setting information supplied from the setting information comparison section 75.

On the other hand, in the case where it is determined in step S34 that the main body side setting information is not newer, that is, the external setting information is newer, the setting information comparison section 75 supplies the external setting information to the setting processing section 72, and the process proceeds to step S36.

In step S36, the setting processing section 72 specifies various settings of the camera 11 on the basis of the external setting information supplied from the setting information comparison section 75.

Thus, the camera 11 specifies, at the time of startup thereof, various settings on the basis of the newer of the main body side setting information and the external setting information.

According to the above processes, in the case where the normal termination process cannot be performed due to an unintended error, the camera 11 can refer to the newer setting information recorded in the server 12 by comparing the main body side setting information and the external setting information at the time of restart, thereby making it possible to reproduce the latest states.

Also, in the case where the normal termination process is performed through updating of setting information with the camera 11 not connected to the network 13, the main body side setting information recorded in the camera 11 is the latest setting information. In this case, the newer setting information recorded in the camera 11 can be referred to by comparing the main body side setting information and the external setting information. Therefore, it is possible to prevent erroneous startup with old settings on the basis of the setting information recorded in the server 12.

As described above, according to the camera system 1 of the present embodiment, it is possible to automatically restore the camera 11 to its latest states at the time of restart even in the event of an unintended error.

However, in the event of an error attributable to latent malfunction of the camera 11 itself or abnormal operation caused by settings at that time (e.g., heating), there is a possibility that an error may recur if the camera 11 is automatically restored to its latest states at the time of restart. In this case, the camera 11 will end up in a loop in which occurrence of an error and restart are repeated.

For this reason, the user may be allowed to select whether or not to automatically restore the camera 11 to its latest states.

Another Example of Startup Process

Figure 10:
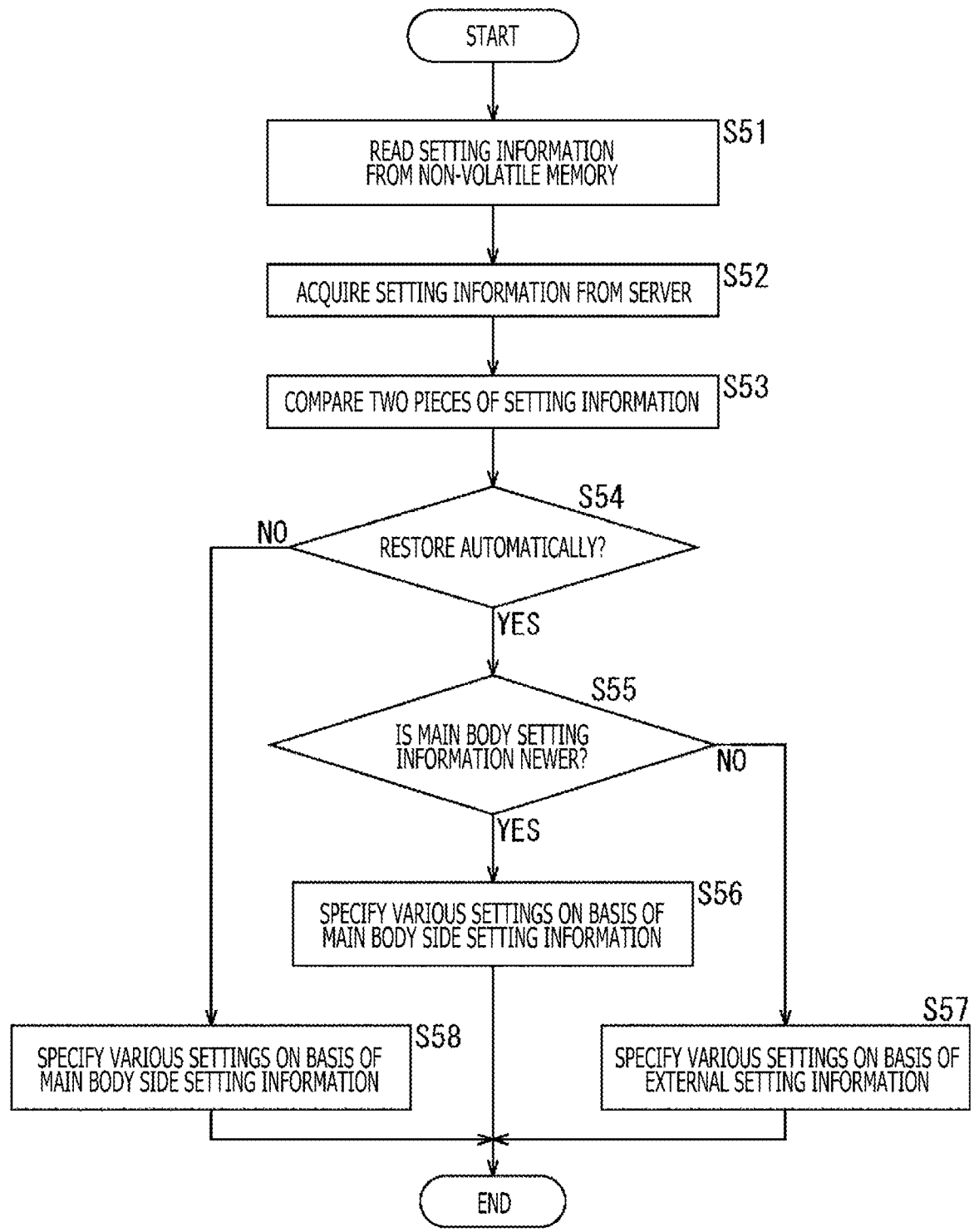
FIG. 10 is a flowchart describing the startup process.

FIG. 10 is a flowchart describing the startup process of the camera 11 that allows the user to select whether or not to automatically restore the camera 11 to its latest states.

It should be noted that steps S51 to S53 and S55 to S57 in the flowchart illustrated in FIG. 10 are similar to steps S31 to S36 in the flowchart illustrated in FIG. 7, respectively. Therefore, the description thereof is omitted.

After comparison of the main body side setting information and the external setting information in step S53, the setting processing section 72 determines, in step S54, whether or not an instruction has been issued to automatically restore the camera 11 to its latest states on the basis of user operation information.

Figure 11:
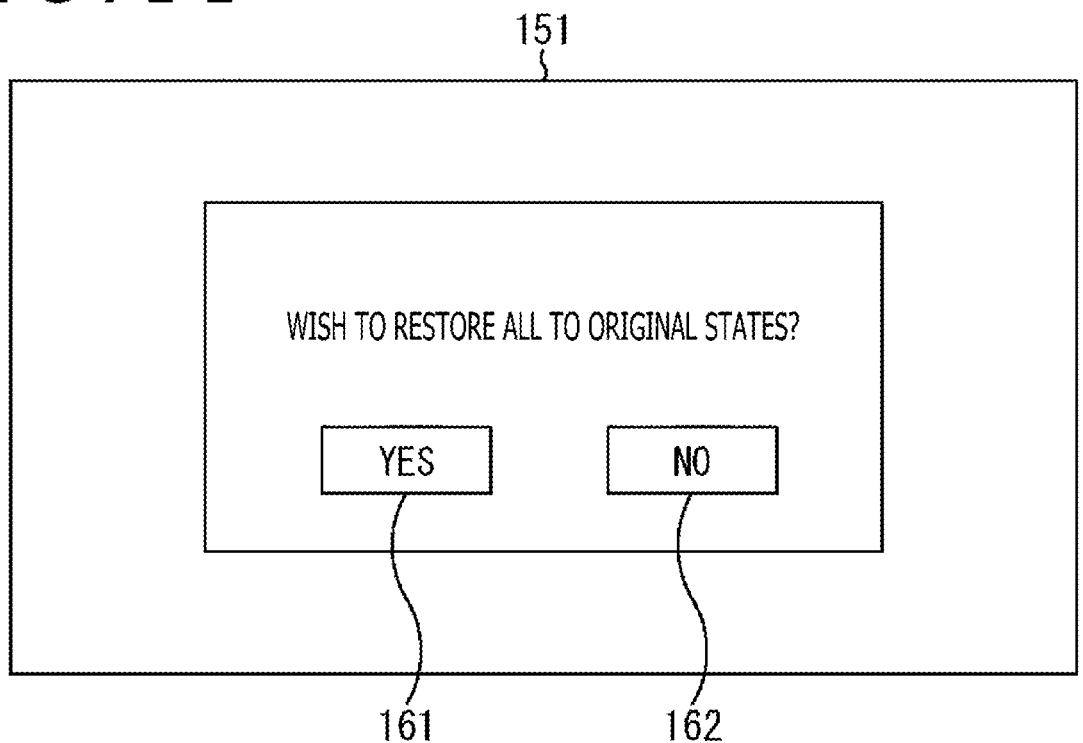
FIG. 11 is a diagram illustrating an example of an automatic restoration confirmation screen.

For example, as illustrated in FIG. 11, the control section 51 displays, on a display 151 provided as an output section 37, a screen that allows the user to select whether or not to restore all the states of the camera 11 to their original states (automatically restore the camera 11 to its latest states). The screen illustrated in FIG. 11 displays a button 161 and a button 162. The button 161 allows the user to select automatic restoration of the camera 11 to its latest states. The button 162 allows the user to select not to automatically restore the camera 11 to its latest states.

In the case where the button 161 is selected in the screen illustrated in FIG. 11, it is determined in step S53 that an instruction has been issued to proceed with automatic restoration, and the process proceeds to step S55. Various settings are specified on the basis of the newer of the main body side setting information and the external setting information.

On the other hand, in the case where the button 162 is selected in the screen illustrated in FIG. 11, it is determined in step S53 that no instruction has been issued to proceed with automatic restoration, and the setting information comparison section 75 supplies the main body side setting information to the setting processing section 72 irrespective of the result of comparison between two pieces of setting information, and the process proceeds to step S58.

In step S58, the setting processing section 72 specifies various settings of the camera 11 on the basis of the main body side setting information supplied from the setting information comparison section 75.

According to the above processes, the user can select whether or not to automatically restore the camera 11 to its latest states. This makes it possible to avoid, in the case an error occurs, a loop in which occurrence of an error and restart are repeated.

Also, in the example illustrated in FIG. 11, only the button 162 may be provided without providing the button 161 so that the user is allowed to select only not to automatically restore the camera 11 to its latest states. This makes it possible for the user to actively select only not to automatically restore the camera 11 to its latest states.

It should be noted that, in this case, the user cannot select automatic restoration of the camera 11 to its latest states. For this reason, in the case where the button 162 is not operated for a fixed time period, this may be construed as meaning that automatic restoration to the latest states has been selected so that various settings are specified on the basis of the newer of the main body side setting information and the external setting information.

Also, in this example, a plurality of pieces of past setting information may be recorded in the non-volatile memory 55 so that the user is allowed to select one of the details of settings represented by these pieces of setting information. This makes it possible for the user to select and reproduce the states specified in the past.

Camera System Whose Cameras Operate in Synchronism

In the camera system 1 of the present embodiment, a plurality of cameras may operate in synchronism.

Figure 12:
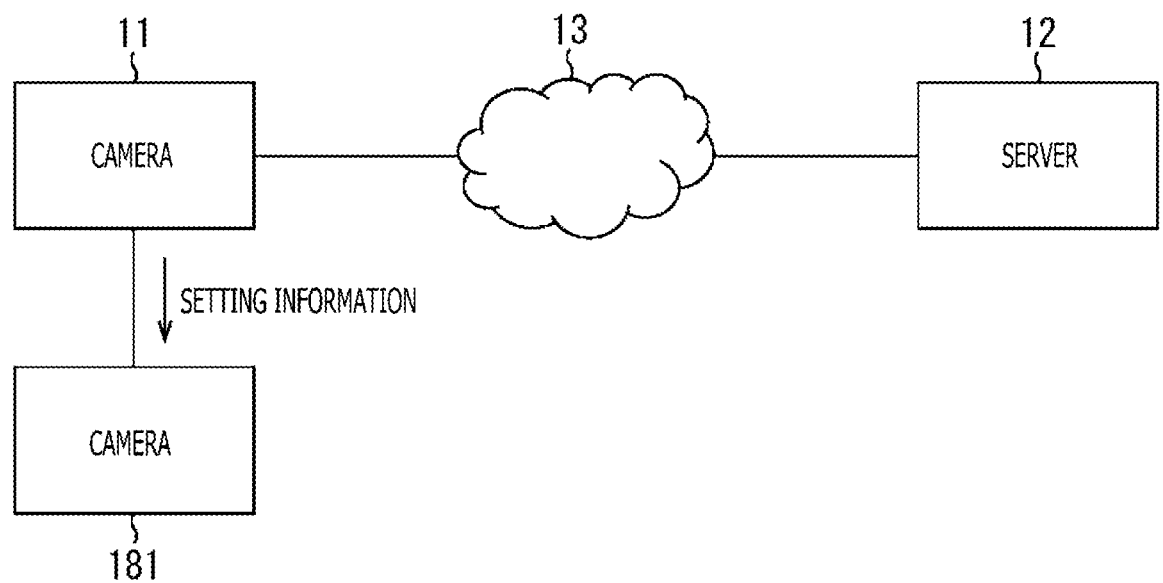
FIG. 12 is a diagram illustrating an overview of a camera system whose cameras operate in synchronism.

For example, in the camera system illustrated in FIG. 12, the camera 11 and a camera 181 operate in synchronism. It should be noted that the camera 181 can have a similar configuration to the camera 11.

In such a configuration, supply of setting information to which the camera 11 has referred by performing the above startup process to the camera 181 ensures that the camera 181 can operate with the same settings as the camera 11.

Also, recording of external setting information in the camera 181 rather than in the server 12 and comparison of main body side setting information and external setting information at the time of restart by the camera 11 allow reproduction of the latest states together with the camera 181 even in the case where the camera 11 cannot perform the normal termination process.

Conversely, recording of external setting information in the camera 11 by the camera 181 and comparison of main body side setting information and external setting information at the time of restart by the camera 181 allow reproduction of the latest states together with the camera 11 even in the case where the camera 181 cannot perform the normal termination process.

3. Configuration of Information Processing System

An example has been described above in which the technology according to the present disclosure is applied to the camera system 1. However, the technology is not limited thereto and is applicable to an information processing system as illustrated in FIG. 13.

Overview of Information Processing System

Figure 13:
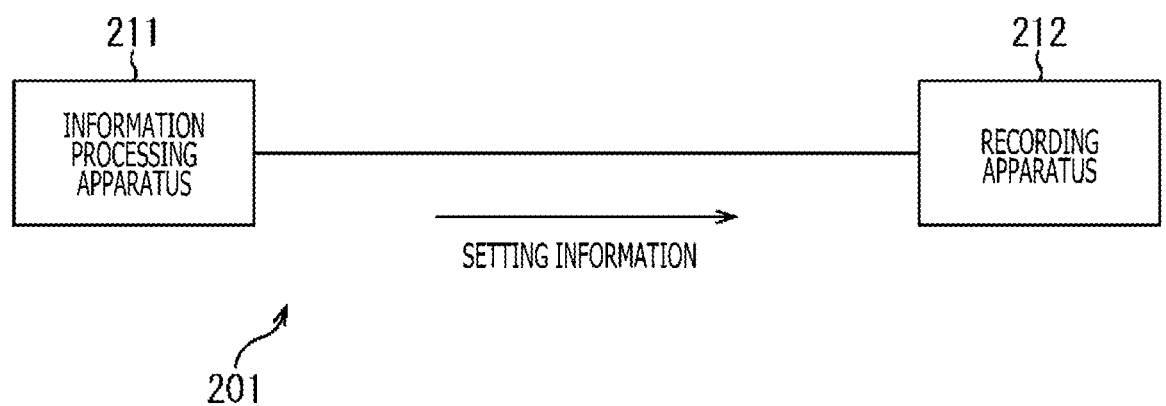
FIG. 13 is a diagram illustrating an overview of an information processing system according to the present embodiment.

FIG. 13 is a diagram illustrating an overview of an information processing system according to the present embodiment.

In an information processing system 201 illustrated in FIG. 13, an information processing apparatus 211 supplies setting information indicating details of settings at that time to a recording apparatus 212 external to the information processing apparatus 211 at a given time such as when settings of the own apparatus are changed.

The recording apparatus 212 records setting information from the information processing apparatus 211.

The information processing apparatus 211 is not limited to a piece of equipment having an imaging function like the camera 11 illustrated in FIG. 1 and may be a mobile phone (smartphone), a personal computer, or other apparatus as long as internal settings are specified on the basis of setting information.

The recording apparatus 212 is not limited to a device such as the server 12 illustrated in FIG. 1 that is connected to the information processing apparatus 211 via a network and may be any apparatus as long as it has a recording area that is separated from the information processing apparatus 211.

In such a configuration, the control section 51 (FIG. 4) is provided in the information processing apparatus 211. As a result, if the normal termination process cannot be performed, the information processing apparatus 211 can refer to the newer setting information recorded in the recording apparatus 212 by comparing main body side setting information and external setting information at the time of restart, thereby allowing for reproduction of the latest states.

4. Application Example

The technology according to the present disclosure is applicable to a variety of products. For example, the technology according to the present disclosure may be realized as an apparatus mounted to any one kind of moving body such as automobile, electric vehicle, hybrid electric vehicle, motorcycle, bicycle, personal mobility, airplane, drone, ship, robot, construction machinery, and agricultural machinery (tractor).

Figure 14:
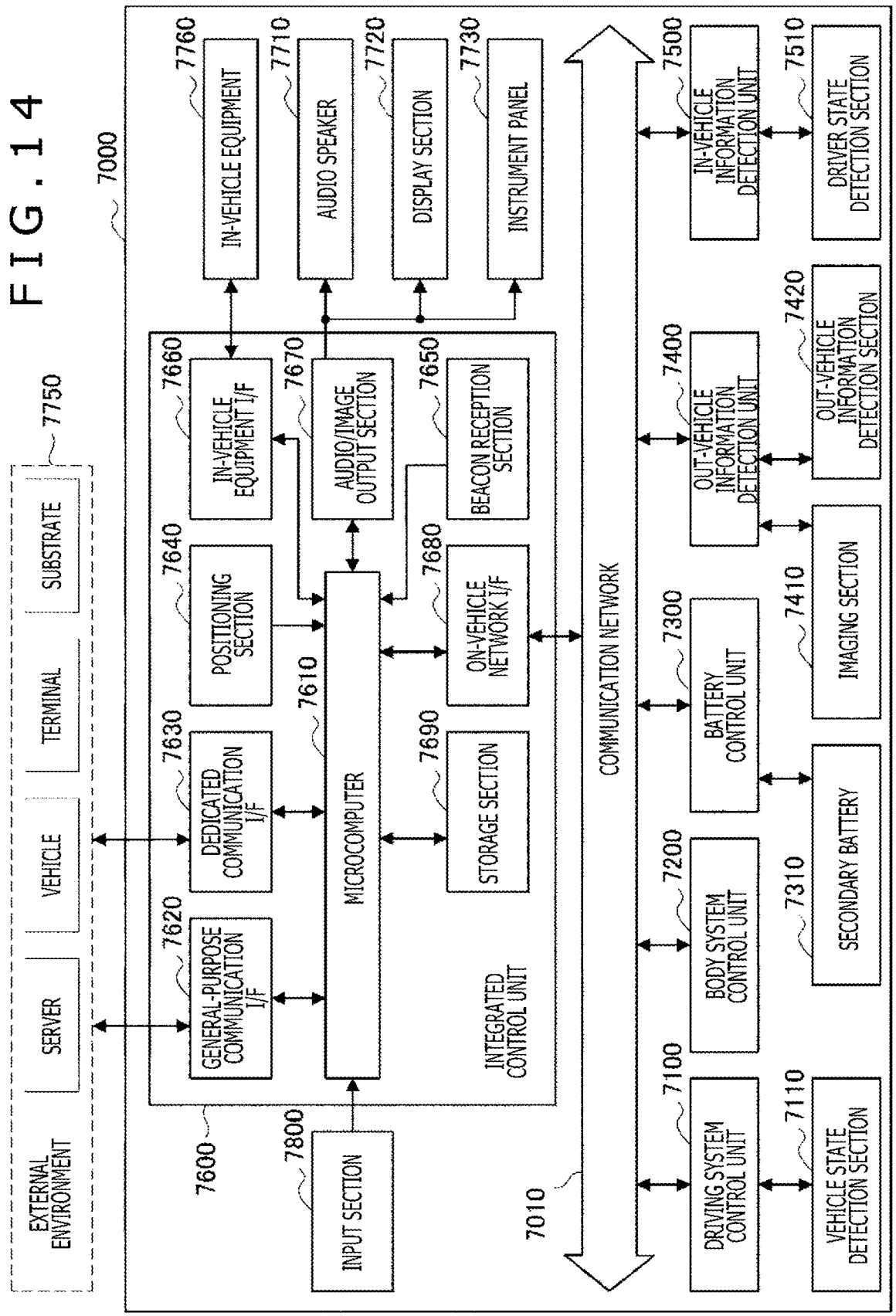
FIG. 14 is a block diagram illustrating an example of a schematic configuration of a vehicle control system.

FIG. 14 is a block diagram illustrating an example of a schematic configuration of a vehicle control system 7000, an example of a mobile body control system to which the technology according to the present disclosure is applicable. The vehicle control system 7000 includes a plurality of electronic control units connected to each other via a communication network 7010. In the example illustrated in FIG. 14, the vehicle control system 7000 includes a driving system control unit 7100, a body system control unit 7200, a battery control unit 7300, an out-vehicle information detection unit 7400, an in-vehicle information detection unit 7500, and an integrated control unit 7600. The communication network 7010 that connects the plurality of these control units may be, for example, a vehicle-mounted communication network compliant with an arbitrary standard such as CAN (Controller Area Network), LIN (Local Interconnect Network), LAN (Local Area Network) or FlexRay (registered trademark).

Each control unit includes a microcomputer, a storage section, and a drive circuit. The microcomputer performs arithmetic processing in accordance with various programs. The storage section stores programs executed by the microcomputer, parameters used for various operations, and so on. The drive circuit drives various apparatuses to be controlled. Each control unit includes not only a network I/F for communicating with other control units via the communication network 7010 but also a communication I/F for communicating with in-vehicle and out-vehicle apparatuses or sensors and other equipment through wired or wireless communication. In FIG. 14, a microcomputer 7610, a general-purpose communication I/F 7620, a dedicated communication I/F 7630, a positioning section 7640, a beacon reception section 7650, an in-vehicle equipment I/F 7660, an audio/image output section 7670, an on-vehicle network I/F 7680, a storage section 7690 are depicted as a functional configuration of the integrated control unit 7600. Other control units also include a microcomputer, a communication I/F, a storage section, and other sections.

The driving system control unit 7100 controls actions of apparatuses related to a driving system of the vehicle in accordance with various programs. For example, the driving system control unit 7100 functions as a control apparatus of a driving force generating apparatus for generating a driving force of a vehicle such as internal combustion engine or driving motor, a driving force transmission mechanism for transmitting a driving force to wheels, a steering mechanism that adjusts a steering angle of the vehicle, a braking apparatus for generating a braking force of the vehicle, and so on. The driving system control unit 7100 may have functions as a control apparatus such as an ABS (Antilock Brake System) or an ESC (Electronic Stability Control).

A vehicle state detection section 7110 is connected to the driving system control unit 7100. The vehicle state detection section 7110 includes at least one of a gyrosensor that detects an angular speed of an axial rotational motion of a vehicle body, an acceleration sensor that detects an acceleration of the vehicle, and a sensor for detecting an amount of operation of an accelerator pedal, an amount of operation of a brake pedal, a steering angle of a steering wheel, an engine speed or a wheel rotational speed, and so on. The driving system control unit 7100 performs arithmetic processing using a signal input from the vehicle state detection section 7110 and controls the internal combustion engine, the driving motor, an electric power steering apparatus, a brake apparatus, or other equipment.

The body system control unit 7200 controls actions of various apparatuses mounted to the vehicle body in accordance with various programs. For example, the body system control unit 7200 functions as a control apparatus of a keyless entry system, a smart key system, a power window apparatus or various lamps such as head lights, back lights, brake lamp, direction indicators, fog lamp, or other lights. In this case, a radio wave emitted from a portable device that substitutes a key or signals of various switches can be input to the body system control unit 7200. The body system control unit 7200 accepts such radio wave or signal inputs and controls a door lock apparatus, the power window apparatus, lamps, and so on of the vehicle.

The battery control unit 7300 controls a secondary battery 7310, a power supply source of the driving motor, in accordance with various programs. For example, a battery temperature, a battery output voltage, a battery remaining capacity, or other information is input to the battery control unit 7300 from a battery apparatus having the secondary battery 7310. The battery control unit 7300 performs arithmetic processing using these signals and controls temperature regulation of the secondary battery 7310 or controls a cooling apparatus and so on provided in the battery apparatus.

The out-vehicle information detection unit 7400 detects information outside the vehicle to which the vehicle control system 7000 is mounted. For example, at least one of an imaging section 7410 and an out-vehicle information detection section 7420 is connected to the out-vehicle information detection unit 7400. The imaging section 7410 includes at least one of a ToF (Time Of Flight) camera, a stereo camera, a monocular camera, an infrared camera, and other camera. The out-vehicle information detection section 7420 includes, for example, at least one of an environment sensor for detecting current weather or climate and a surrounding information detection sensor for detecting other vehicles, obstacles, pedestrians or others around the vehicle to which the vehicle control system 7000 is mounted.

The environment sensor may be at least one of a rain drop sensor that detects rainy weather, a fog sensor that detects fog, a daylight sensor that detects sunshine level, and a snow sensor that detects snowfall. The surrounding information detection sensor may be at least one of an ultrasonic sensor, a radar apparatus, and a LIDAR (Light Detection and Ranging, Laser Imaging Detection and Ranging) apparatus. These imaging section 7410 and out-vehicle information detection section 7420 may each be an independent sensor or apparatus or an apparatus that includes a plurality of sensors or apparatuses combined together.

Figure 15:
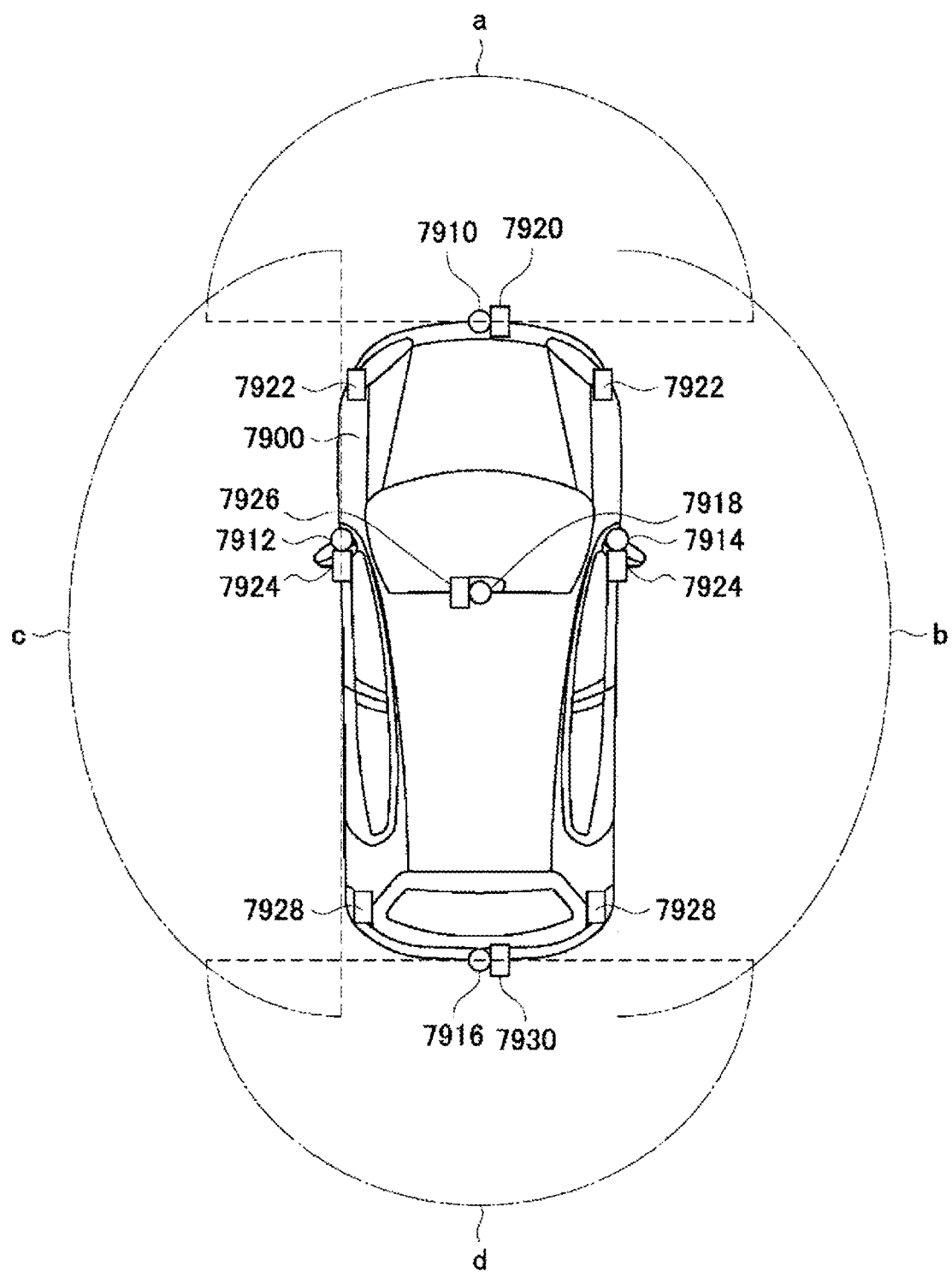
FIG. 15 is an explanatory diagram illustrating an example of installation positions of an out-vehicle information detection section and an imaging section.

Here, FIG. 15 illustrates an example of installation positions of the imaging section 7410 and the out-vehicle information detection section 7420. Imaging sections 7910, 7912, 7914, 7916, and 7918 are, for example, provided at least at one of positions among a front nose, side mirrors, a rear bumper, a back door, and a top of a front glass in a compartment of a vehicle 7900. The imaging section 7910 provided on the front nose and the imaging section 7918 provided on the top of the front glass in the compartment acquire mainly front images of the vehicle 7900. The imaging sections 7912 and 7914 provided on the side mirrors acquire mainly side images of the vehicle 7900. The imaging section 7916 provided on the rear bumper or the back door acquires mainly rear images of the vehicle 7900. The imaging section 7918 provided on the top of the front glass in the compartment is used mainly to detect vehicles ahead, pedestrians, obstacles, traffic lights, traffic signs, driving lanes, or other objects.

It should be noted that FIG. 15 illustrates examples of shooting ranges of the imaging sections 7910, 7912, 7914, and 7916. An imaging range "a" illustrates the imaging range of the imaging section 7910 provided on the front nose. Imaging ranges "b" and "c" illustrate the imaging ranges of the imaging sections 7912 and 7914 provided on the side mirrors. An imaging range "d" illustrates the imaging range of the imaging section 7916 provided on the rear bumper or the back door. For example, superimposing image data, captured by the imaging sections 7910, 7912, 7914, and 7916, one on top of the other, provides a bird's eye view image as seen from above the vehicle 7900.

Out-vehicle information detection sections 7920, 7922, 7924, 7926, 7928, and 7930 provided on the front, the rear, the sides, corners, and on the top of the front glass in the compartment of the vehicle 7900 may be, for example, ultrasonic sensors or radar apparatuses. The out-vehicle information detection sections 7920, 7926, and 7930 provided on the front nose, the rear bumper, the back door, and on the top of the front glass in the compartment of the vehicle 7900 may be, for example, LIDAR apparatuses. These out-vehicle information detection sections 7920 to 7930 are used mainly to detect vehicles ahead, pedestrians, obstacles, or other objects.

A description will continue with reference back to FIG. 14. The out-vehicle information detection unit 7400 causes the imaging section 7410 to capture images outside the vehicle and receives captured image data. Also, the out-vehicle information detection unit 7400 receives detection information from the connected out-vehicle information detection section 7420. In the case where the out-vehicle information detection section 7420 is an ultrasonic sensor, a radar apparatus, or an LIDAR apparatus, the out-vehicle information detection unit 7400 causes an ultrasonic wave, an electromagnetic wave, or other wave to be emitted and receives information regarding a received reflected wave. The out-vehicle information detection unit 7400 may perform an object detection process for detecting persons, vehicles, obstacles, signs, characters on the road, or others or a distance detection process on the basis of the received information. The out-vehicle information detection unit 7400 may perform an environment recognition process for detecting rainfall, fog, road surface condition, or other condition on the basis of the received information. The out-vehicle information detection unit 7400 may calculate a distance to an object outside the vehicle on the basis of the received information.

Also, the out-vehicle information detection unit 7400 may perform an image recognition process for recognizing persons, vehicles, obstacles, signs, characters on the road, or others or a distance detection process on the basis of the received image data. The out-vehicle information detection unit 7400 may generate a bird's eye view image or a panoramic image by performing distortion correction, position alignment, or other process on the received image data and combining the data with image data captured by the different imaging section 7410. The out-vehicle information detection unit 7400 may perform a viewpoint conversion process using image data captured by the different imaging section 7410.

The in-vehicle information detection unit 7500 detects in-vehicle information. For example, a driver state detection section 7510 that detects the driver's state is connected to the in-vehicle information detection unit 7500. The driver state detection section 7510 may include a camera that images the driver, a biological sensor that detects biological information of the driver, a microphone that collects audio in the compartment, or other apparatus. A biological sensor is provided, for example, on a seat surface, the steering wheel, or other location to detect biological information of a passenger sitting on the seat or the driver holding the steering wheel. The in-vehicle information detection unit 7500 may calculate fatigue level or concentration level of the driver on the basis of detection information input from the driver state detection section 7510. Whether or not the driver is drowsing may be thus determined. The in-vehicle information detection unit 7500 may subject a collected audio signal to a noise canceling process or other process.

The integrated control unit 7600 controls the actions within the vehicle control system 7000 as a whole in accordance with various programs. An input section 7800 is connected to the integrated control unit 7600. The input section 7800 is realized, for example, by a touch panel, buttons, a microphone, switches, levers, or others on which input operation can be made by passengers. Data acquired through audio recognition of audio input to the microphone may be input to the integrated control unit 7600. The input section 7800 may be, for example, a remote control apparatus that exploits infrared radiation or other radio waves or an external connection apparatus such as mobile phone, PDA (Personal Digital Assistant), or others capable of manipulating the vehicle control system 7000. The input section 7800 may be, for example, a camera, and in this case, a passenger can input information by gesture. Alternatively, data acquired by detecting motions of a wearable apparatus worn by a passenger may be input. Further, the input section 7800 may include, for example, an input control circuit that generates an input signal on the basis of the above information input by a passenger or others by using the input section 7800 and outputs the input signal to the integrated control unit 7600. Passengers and so on input various kinds of data to the vehicle control system 7000 and instruct the vehicle control system 7000 to process data, by using this input section 7800.

The storage section 7690 may include a ROM (Read Only Memory) that stores various programs executed by a microcomputer and a RAM (Random Access Memory) that stores various parameters, arithmetic processing results, sensor values, or other data. Also, the storage section 7690 may be realized by a magnetic storage device such as HDD (Hard Disc Drive), semiconductor storage device, optical storage device, magneto-optical storage device, or other device.

The general-purpose communication I/F 7620 is a general-purpose communication I/F that intermediates communication with various apparatuses existing in an outside environment 7750. A cellular communication protocol such as GSM (registered trademark) (Global System of Mobile communications), WiMAX (registered trademark), LTE (registered trademark) (Long Term Evolution), or LTE-A (LTE-Advanced) or other wireless communication protocol such as wireless LAN (also referred to as Wi-Fi (registered trademark)) or Bluetooth (registered trademark) may be implemented in the general-purpose communication I/F 7620. The general-purpose communication I/F 7620 may connect, for example, to an apparatus (e.g., application server or control server) existing on an external network (e.g., Internet, cloud network, or carrier's own network) via a base station or an access point. Also, the general-purpose communication I/F 7620 may connect to a terminal existing near the vehicle (e.g., driver's, pedestrian's or shop's terminal or MTC (Machine Type Communication) terminal) by using, for example, P2P (Peer To Peer) technology.

The dedicated communication I/F 7630 is a communication I/F that supports a communication protocol developed to be used in vehicles. A standard protocol such as WAVE (Wireless Access in Vehicle Environment), which is a combination of IEEE802.11p, a lower layer, and IEEE1609, an upper layer, DSRC (Dedicated Short Range Communications), or cellular communication protocol, for example, may be implemented in the dedicated communication I/F 7630. The dedicated communication I/F 7630 typically carries out V2X communication, a concept that includes one or more of vehicle to vehicle communication, vehicle to infrastructure communication, vehicle to home communication, and vehicle to pedestrian communication.

The positioning section 7640, for example, carries out positioning by receiving a GNSS (Global Navigation Satellite System) signal (e.g., GPS (Global Positioning System) signal from GPS satellite) from a GNSS satellite and generates position information including longitude, latitude, and altitude of the vehicle. It should be noted that the positioning section 7640 may identify the current position by exchanging signals with wireless access points or acquire position information from a terminal such as mobile phone, PHS, or smartphone that has a positioning function.

The beacon reception section 7650, for example, acquires current position, traffic jams, road closures, required time, or other information by receiving radio waves or electromagnetic waves emitted from wireless stations or other apparatuses installed on roads. It should be noted that the functions of the beacon reception section 7650 may be included in the dedicated communication I/F 7630 described above.

The in-vehicle equipment I/F 7660 is a communication interface that intermediates connection between the microcomputer 7610 and various pieces of in-vehicle equipment 7760 existing in the vehicle. The in-vehicle equipment I/F 7660 may establish wireless connection by using a wireless communication protocol such as wireless LAN, Bluetooth (registered trademark), NFC (Near Field Communication), or WUSB (Wireless USB). Also, the in-vehicle equipment I/F 7660 may establish wired connection such as USB (Universal Serial Bus), HDMI (registered trademark) (High-Definition Multimedia Interface or MHL (Mobile High-definition Link)) by using a connection terminal which is not illustrated (and a cable if required). The in-vehicle equipment 7760, for example, may include at least one of a piece of mobile equipment or wearable equipment owned by a passenger and a piece of information equipment carried into or installed in the vehicle. Also, the in-vehicle equipment 7760 may include a navigation apparatus that searches for a route to an arbitrary destination. The in-vehicle equipment I/F 7660 exchanges control signals or data signals with these pieces of in-vehicle equipment 7760.

The on-vehicle network I/F 7680 is an interface that intermediates communication between the microcomputer 7610 and the communication network 7010. The on-vehicle network I/F 7680 sends and receives signals and others according to a given protocol supported by the communication network 7010.

The microcomputer 7610 of the integrated control unit 7600 controls the vehicle control system 7000 in accordance with various programs on the basis of information acquired via at least one of the general-purpose communication I/F 7620, the dedicated communication I/F 7630, the positioning section 7640, the beacon reception section 7650, the in-vehicle equipment I/F 7660, and the on-vehicle network I/F 7680. For example, the microcomputer 7610 may calculate a control target value of the driving force generating apparatus, the steering mechanism, or the brake apparatus on the basis of in-vehicle and out-vehicle information acquired and issue a control instruction to the driving system control unit 7100. For example, the microcomputer 7610 may perform cooperative control with an aim of realizing ADAS (Advanced Driver Assistance System) functions including vehicle collision avoidance or impact alleviation, follow-up traveling based on vehicle-to-vehicle distance, constant vehicle speed traveling, vehicle collision warning, or vehicle lane deviation warning. Also, the microcomputer 7610 may perform cooperative control with an aim of achieving self-driving that permits autonomous traveling irrespective of driver's operation by controlling the driving force generating apparatus, the steering mechanism, the braking apparatus, or other equipment.

The microcomputer 7610 may generate 3D distance information between the vehicle and surrounding objects such as structures and persons and create local map information including information around the current position of the vehicle on the basis of information acquired via at least one of the general-purpose communication I/F 7620, the dedicated communication I/F 7630, the positioning section 7640, the beacon reception section 7650, the in-vehicle equipment I/F 7660, and the on-vehicle network I/F 7680. Also, the microcomputer 7610 may predict a risk such as collision of the vehicle, approaching of pedestrian, or entry into a closed road on the basis of the acquired information and generate a warning signal. A warning signal may be a signal that causes a warning tone to be produced or a warning lamp to be lit, for example.

The audio/image output section 7670 sends at least either an audio or image output signal to an output apparatus that is capable of visually or auditorily notifying information to the vehicle's passenger or outside of the vehicle. In the example illustrated in FIG. 14, an audio speaker 7710, a display section 7720, and an instrument panel 7730 are illustrated as output apparatuses. The display section 7720 may include, for example, at least one of an on-board display and a head-up display. The display section 7720 may include an AR (Augmented Reality) display function. The output apparatus may be an apparatus other than the above such as headphones, wearable device worn by a passenger such as goggle-type display, projector, or lamp. When the output apparatus is a display apparatus, the display apparatus visually displays results obtained by various processes performed by the microcomputer 7610 or information received from other control units in various forms such as text, image, table, and graph. Also, in the case where the output apparatus is an audio output apparatus, the audio output apparatus converts an audio signal that includes reproduced audio data, acoustic data, or other data into an analog signal and auditorily outputs the analog signal.

It should be noted that, in the example illustrated in FIG. 14, at least two control units connected via the communication network 7010 may be combined into a single control unit. Alternatively, each control unit may include a plurality of control units. Further, the vehicle control system 7000 may include a separate control unit that is not illustrated. Also, in the description given above, some or all of the functions assumed by any of the control units may be assumed by other control unit. That is, as long as information is sent and received via the communication network 7010, given arithmetic processing may be performed by one of the control units. Similarly, a sensor or apparatus connected to one of the control units may be connected to other control unit so that the plurality of control units mutually send and receive detection information via the communication network 7010.

The information processing apparatus 211 according to the present embodiment described using FIG. 13 is applicable to the vehicle control system 7000, an application example illustrated in FIG. 14. For example, the control section 51 (FIG. 4) included in the information processing apparatus 211 corresponds to the microcomputer 7610 of the integrated control unit 7600. For example, the microcomputer 7610 specifies, at the time of its startup, various settings on the basis of the newer of the main body side setting information and the external setting information. As a result, in the case where the normal termination process cannot be performed due to a vehicle accident or other cause, it is possible to refer to the newer setting information recorded in the external environment by comparing the main body side setting information and the external setting information at the time of restart, thereby making it possible to reproduce the latest states.

It should be noted that embodiments of the present technology are not limited to the embodiment described above and can be modified in various ways without departing from the gist of the present technology.

Further, the present technology can have the following configurations:

(1)

A camera comprising:

a memory configured to store a first set of backup camera settings;

communication circuitry configured to communicate with a server, the server configured to store a second set of backup camera settings; and control circuitry configured to perform a start-up process when the camera is turned ON, the start-up process includes comparing the first set of backup camera settings to the second set of backup camera settings to determine whether the first set of backup camera settings is newer than the second set of backup camera settings.

(2)

The camera as stated in paragraph (1) above, wherein the start-up process further includes acquiring the first set of backup camera settings stored in the memory, and controlling the communication circuitry to acquire the second set of backup camera settings stored in the server.

(3)

The camera as stated in paragraph (2) above, wherein controlling the communication circuitry to acquire the second set of backup camera settings stored in the server further includes controlling the communication circuitry to acquire the second set of backup camera settings directly from the server.

(4)

The camera as stated in paragraphs (1) to (3) above, wherein the control circuitry is further configured to set the first set of backup camera settings as current camera settings in response to determining that the first set of backup camera settings is newer than the second set of backup camera settings.

(5)

The camera as stated in paragraphs (1) to (4) above, wherein the control circuitry is further configured to set the second set of backup camera settings as current camera settings in response to determining that the second set of backup camera settings is newer than the first set of backup camera settings.

(6)

The camera as stated in paragraphs (1) to (5) above, wherein the control circuitry is further configured to receive image data of a subject and operation information from a user interface, and generate a first set of camera settings based on the operation information in response to receiving the image data and the operation information, the first set of camera settings being associated with the image data of the subject that is received.

(7)

The camera as stated in paragraph (6) above, wherein the control circuitry is further configured to control the memory to store the first set of camera settings as the first set of backup camera settings in response to generating the first set of camera settings, and control the server to store the first set of camera settings as the second set of backup camera settings in response to generating the first set of camera settings.

(8)

A method comprising:

controlling, with a control circuitry, a memory of a camera to store a first set of backup camera settings; and performing, with the control circuitry, a start-up process when the camera is turned ON, the start-up process includes comparing the first set of backup camera settings to a second set of backup camera settings stored in a server to determine whether the first set of backup camera settings is newer than the second set of backup camera settings.

(9)

The method as stated in paragraph (8) above, wherein the start-up process further includes acquiring the first set of backup camera settings stored in the memory; and controlling a communication circuitry to acquire the second set of backup camera settings stored in the server.

(10)

The method as stated in paragraph (9) above, wherein controlling the communication circuitry to acquire the second set of backup camera settings stored in the server further includes controlling the communication circuitry to acquire the second set of backup camera settings directly from the server.

(11)

The method as stated in paragraphs (8) to (10) above, further comprising:

setting the first set of backup camera settings as current camera settings in response to determining that the first set of backup camera settings is newer than the second set of backup camera settings.

(12)

The method as stated in paragraphs (8) to (11) above, further comprising:

setting the second set of backup camera settings as current camera settings in response to determining that the second set of backup camera settings is newer than the first set of backup camera settings.

(13)

The method as stated in paragraphs (8) to (12) above, further comprising:

receiving image data of a subject and operation information from a user interface; and generating a first set of camera settings based on the operation information in response to receiving the image data of the subject and the operation information, the first set of camera settings being associated with the image data of the subject that is received.

(14)

The method as stated in paragraph (13) above, further comprising:

controlling the memory to store the first set of camera settings as the first set of backup camera settings in response to generating the first set of camera settings; and controlling the server to store the first set of camera settings as the second set of backup camera settings in response to generating the first set of camera settings.

(15)

A non-transitory computer-readable medium comprising program instructions that, when executed by an electronic processor, causes the electronic processor to perform a set of operations comprising:

controlling a memory of a camera to store a first set of backup camera settings; and performing a start-up process when the camera is turned ON, the start-up process includes comparing the first set of backup camera settings to a second set of backup camera settings stored in a server to determine whether the first set of backup camera settings is newer than the second set of backup camera settings.

(16)

The non-transitory computer-readable medium as stated in paragraph (15) above, wherein the start-up process further includes acquiring the first set of backup camera settings stored in the memory; and controlling a communication circuitry to acquire the second set of backup camera settings stored in the server.

(17)

The non-transitory computer-readable medium as stated in paragraphs (15) or (16) above, the set of operations further comprising:

setting the second set of backup camera settings as current camera settings in response to determining that the second set of backup camera settings is newer than the first set of backup camera settings.

(18)

The non-transitory computer-readable medium as stated in paragraphs (15) to (17) above, the set of operations further comprising:

receiving image data of a subject and operation information from a user interface;

generating a first set of camera settings based on the operation information in response to receiving the image data of the subject and the operation information, the first set of camera settings being associated with the image data of the subject that is received;

controlling the memory to store the first set of camera settings as the first set of backup camera settings in response to generating the first set of camera settings; and controlling the server to store the first set of camera settings as the second set of backup camera settings in response to generating the first set of camera settings.

(19)

A system comprising:

a server configured to store a first set of backup camera settings; and a camera including a memory configured to store a second set of backup camera settings, communication circuitry configured to communicate with the server, and control circuitry configured to perform a start-up process when the camera is turned ON, the start-up process includes comparing the second set of backup camera settings to the first set of backup camera settings to determine whether the second set of backup camera settings is newer than the first set of backup camera settings.

(20)

The system as stated in paragraph (19) above, further comprising:

a vehicle including a vehicle control system, the vehicle control system including the camera.

REFERENCE SIGNS LIST

1 Camera system
11 Camera
12 Server
13 Network
51 Control section
52 Imaging section
53 Encoder, 54 RAM
55 Non-volatile memory
56 Communication section
61 Control section
62 Communication section
63 Recording section
71 Setting information generation section
72 Setting processing section
73 Recording control section
74 Communication control section
75 Setting information comparison section
211 Information processing apparatus
212 Recording apparatus

The invention claimed is:

1. A camera comprising:
a memory configured to store a first set of backup camera settings associated with the camera;
communication circuitry configured to communicate with a server storing a second set of backup camera settings associated with the camera; and
control circuitry configured to
detect the camera changing from a POWER OFF state to a POWER ON state, and
perform a start-up process every time the camera changes from the POWER OFF state to the POWER ON state, the start-up process includes
determining whether the memory includes the first set of backup camera settings,
responsive to determining that the memory does not include the first set of backup camera settings, controlling the memory to store a first set of camera settings as the first set of backup camera settings,
determining whether the server includes the second set of backup camera settings,
responsive to determining that the server does not include the second set of backup camera settings, controlling the server to store the first set of camera settings as the second set of backup camera settings,
responsive to determining that the memory includes the first set of backup camera settings, acquiring the first set of backup camera settings,
responsive to determining that the server includes the second set of backup camera settings, acquiring the second set of backup camera settings,
responsive to acquiring the first set of backup camera settings and the second set of backup camera settings, comparing the first set of backup camera settings to the second set of backup camera settings to determine whether the first set of backup camera settings is newer than the second set of backup camera settings, and
set one of the first set of backup camera settings or the second set of backup camera settings as current camera settings based on the comparison of the first set of backup camera settings that is acquired to the second set of backup camera settings that is acquired.

2. The camera according to claim 1, wherein the start-up process further includes
controlling the communication circuitry to acquire the second set of backup camera settings directly from the server.

3. The camera according to claim 1, wherein the control circuitry is further configured to set the first set of backup camera settings as the current camera settings in response to determining that the first set of backup camera settings is newer than the second set of backup camera settings.

4. The camera according to claim 1, wherein the control circuitry is further configured to set the second set of backup camera settings as the current camera settings in response to determining that the second set of backup camera settings is newer than the first set of backup camera settings.

5. The camera according to claim 1, wherein the control circuitry is further configured to
receive image data of a subject and operation information from a user interface, and
generate the first set of camera settings based on the operation information in response to receiving the image data and the operation information, the first set of camera settings being associated with the image data of the subject that is received.

6. The camera according to claim 1, wherein the control circuitry is further configured to
detect an error, and
perform a restart process in response to detecting the error,
wherein the restart process causes the camera to change from the POWER OFF state to the POWER ON state.

7. The camera according to claim 1, wherein a user power ON operation causes the camera to change from the POWER OFF state to the POWER ON state.

8. A method comprising:
detecting, with control circuitry, a camera changing from a POWER OFF state to a POWER ON state; and
performing, with the control circuitry, a start-up process every time the camera changes from the POWER OFF state to the POWER ON state, the start-up process includes
determining whether a memory includes a first set of backup camera settings,
responsive to determining that the memory does not include the first set of backup camera settings, controlling the memory to store a first set of camera settings as the first set of backup camera settings,
determining whether a server includes a second set of backup camera settings,
responsive to determining that the server does not include the second set of backup camera settings, controlling the server to store the first set of camera settings as the second set of backup camera settings,
responsive to determining that the memory includes the first set of backup camera settings, acquiring the first set of backup camera settings,
responsive to determining that the server includes the second set of backup camera settings, acquiring the second set of backup camera settings,
responsive to acquiring the first set of backup camera settings and the second set of backup camera settings, comparing the first set of backup camera settings to the second set of backup camera settings to determine whether the first set of backup camera settings is newer than the second set of backup camera settings, and setting one of the first set of backup camera settings or the second set of backup camera settings as current camera settings based on the comparison of the first set of backup camera settings that is acquired to the second set of backup camera settings that is acquired.

9. The method according to claim 8, wherein the start-up process further includes
controlling a communication circuitry to acquire the second set of backup camera settings directly from the server.

10. The method according to claim 8, further comprising:
setting the first set of backup camera settings as the current camera settings in response to determining that the first set of backup camera settings is newer than the second set of backup camera settings.

11. The method according to claim 8, further comprising:
setting the second set of backup camera settings as the current camera settings in response to determining that the second set of backup camera settings is newer than the first set of backup camera settings.

12. The method according to claim 8, further comprising:
receiving image data of a subject and operation information from a user interface; and
generating the first set of camera settings based on the operation information in response to receiving the image data of the subject and the operation information, the first set of camera settings being associated with the image data of the subject that is received.

13. A non-transitory computer-readable medium comprising program instructions that, when executed by an electronic processor, causes the electronic processor to perform a set of operations comprising:
detecting a camera changing from a POWER OFF state to a POWER ON state; and
performing a start-up process every time the camera changes from the POWER OFF state to the POWER ON state, the start-up process includes
determining whether a memory includes a first set of backup camera settings,
responsive to determining that the memory does not include the first set of backup camera settings, controlling the memory to store a first set of camera settings as the first set of backup camera settings,
determining whether a server includes a second set of backup camera settings,
responsive to determining that the server does not include the second set of backup camera settings, controlling the server to store the first set of camera settings as the second set of backup camera settings,
responsive to determining that the memory includes the first set of backup camera settings, acquiring the first set of backup camera settings,
responsive to determining that the server includes the second set of backup camera settings, acquiring the second set of backup camera settings,
responsive to acquiring the first set of backup camera settings and the second set of backup camera settings, comparing the first set of backup camera settings to the second set of backup camera settings to determine whether the first set of backup camera settings is newer than the second set of backup camera settings, and
setting one of the first set of backup camera settings or the second set of backup camera settings as current camera settings based on the comparison of the first set of backup camera settings that is acquired to the second set of backup camera settings that is acquired.

14. The non-transitory computer-readable medium according to claim 13, the set of operations further comprising:
setting the second set of backup camera settings as the current camera settings in response to determining that the second set of backup camera settings is newer than the first set of backup camera settings.

15. The non-transitory computer-readable medium according to claim 13, the set of operations further comprising:
receiving image data of a subject and operation information from a user interface; and
generating the first set of camera settings based on the operation information in response to receiving the image data of the subject and the operation information, the first set of camera settings being associated with the image data of the subject that is received.

16. A system comprising:
a server configured to store a first set of backup camera settings; and
a camera including
a memory configured to store a second set of backup camera settings associated with the camera,
communication circuitry configured to communicate with the server, and
control circuitry configured to
detect a camera power ON operation that causes the camera to change from a POWER off state to a POWER ON state, and
perform a start-up process every time the camera changes from the POWER OFF state to the POWER ON state, the start-up process includes
determining whether the memory includes the first set of backup camera settings,
responsive to determining that the memory does not include the first set of backup camera settings, controlling the memory to store a first set of camera settings as the first set of backup camera settings,
determining whether the server includes the second set of backup camera settings,
responsive to determining that the server does not include the second set of backup camera settings, controlling the server to store the first set of camera settings as the second set of backup camera settings,
responsive to determining that the memory includes the first set of backup camera settings, acquiring the first set of backup camera settings,
responsive to determining that the server includes the second set of backup camera settings, acquiring the second set of backup camera settings,
responsive to acquiring the first set of backup camera settings and the second set of backup camera settings, comparing the second set of backup camera settings to the first set of backup camera settings to determine whether the second set of backup camera settings is newer than the first set of backup camera settings, and
set one of the first set of backup camera settings or the second set of backup camera settings as current camera settings based on comparison of the first set of backup camera settings that is acquired to the second set of backup camera settings that is acquired.

17. The system according to claim 16, further comprising:
a vehicle including a vehicle control system, the vehicle control system including the camera.

* * * * *